(12) United States Patent
Chamberlin et al.

(10) Patent No.: US 9,996,582 B2
(45) Date of Patent: *Jun. 12, 2018

(54) QUERY TUNING IN THE CLOUD

(71) Applicant: International Business Machines Corporation, Armonk, NY (US)

(72) Inventors: Steven M. Chamberlin, San Jose, CA (US); Ting Y. Leung, San Jose, CA (US); Kevin H. Low, San Jose, CA (US); Kun Peng Ren, Thornhill (CA); Chi Man J. Sizto, San Jose, CA (US); Daniel C. Zilio, Georgetown (CA)

(73) Assignee: International Business Machines Corporation, Armonk, NY (US)

( * ) Notice: Subject to any disclaimer, the term of this patent is extended or adjusted under 35 U.S.C. 154(b) by 401 days.

This patent is subject to a terminal disclaimer.

(21) Appl. No.: 14/730,292

(22) Filed: Jun. 4, 2015

(65) Prior Publication Data

US 2016/0140177 A1 May 19, 2016

Related U.S. Application Data

(63) Continuation of application No. 14/541,731, filed on Nov. 14, 2014.

(51) Int. Cl.
*G06F 17/30* (2006.01)

(52) U.S. Cl.
CPC .. *G06F 17/30463* (2013.01); *G06F 17/30306* (2013.01); *G06F 17/30442* (2013.01); *G06F 17/30477* (2013.01)

(58) Field of Classification Search
CPC ........ G06F 17/30463; G06F 17/30442; G06F 17/30477; G06F 17/30306
See application file for complete search history.

(56) References Cited

U.S. PATENT DOCUMENTS

| | | | | |
|---|---|---|---|---|
| 7,370,043 B1 * | 5/2008 | Shelton | ............ | G06F 17/30463 707/690 |
| 7,499,907 B2 * | 3/2009 | Brown | ............ | G06F 17/30336 |
| 7,747,606 B2 * | 6/2010 | Dageville | ......... | G06F 17/30306 707/713 |
| 7,979,422 B2 * | 7/2011 | Belknap | ............ | G06F 17/30463 707/713 |
| 8,180,762 B2 | 5/2012 | Steinbach et al. | | |

(Continued)

OTHER PUBLICATIONS

Appendix P—List of IBM Patents or Patent Applications Treated as Related.

(Continued)

*Primary Examiner* — Leslie Wong
(74) *Attorney, Agent, or Firm* — David B. Woycechowsky

(57) ABSTRACT

Tuning a production database system through the use of a remote mimic. In response to receipt of a query tuning request against a database system, information about that system is obtained and a mimic of the system is set up in a remote system environment. The mimic aims to imitate the database system in all relevant ways with respect to the tuning request. A tuning analysis is then performed on this mimic system such that there is substantially no impact to operations of the original database system. Tuning results are then applied to the original database system. The entire process takes place with little or no human intervention.

10 Claims, 6 Drawing Sheets

250

(56) References Cited

U.S. PATENT DOCUMENTS

| | | | |
|---|---|---|---|
| 8,341,178 B2 | 12/2012 | Belknap et al. | |
| 8,402,119 B2 | 3/2013 | Soulios et al. | |
| 8,527,473 B1 | 9/2013 | Brown et al. | |
| 9,734,200 B2 | 8/2017 | Gangloor et al. | |
| 2006/0085484 A1* | 4/2006 | Raizman | G06F 17/30336 |
| 2007/0022100 A1* | 1/2007 | Kitsuregawa | G06F 17/30433 |
| 2007/0174335 A1* | 7/2007 | Konig | G06F 17/30306 |
| 2007/0271570 A1 | 11/2007 | Brown et al. | |
| 2008/0235182 A1* | 9/2008 | Baranczyk | G06F 17/30306 |
| 2009/0024563 A1* | 1/2009 | Sengar | G06F 11/3409 |
| 2009/0077017 A1* | 3/2009 | Belknap | G06F 17/30306 |
| 2009/0100004 A1* | 4/2009 | Andrei | G06F 17/30424 |
| 2009/0106219 A1* | 4/2009 | Belknap | G06F 17/30469 |
| 2009/0106320 A1* | 4/2009 | Dageville | G06F 17/30469 |
| 2009/0132471 A1* | 5/2009 | Brown | G06F 17/30306 |
| 2009/0287638 A1* | 11/2009 | Bestgen | G06F 17/30306 |
| 2010/0306188 A1* | 12/2010 | Cunningham | G06F 17/30463 707/713 |
| 2010/0318543 A1* | 12/2010 | Chaudhuri | G06F 9/45512 707/759 |
| 2011/0161310 A1* | 6/2011 | Tang | G06F 17/30463 707/714 |
| 2013/0067440 A1* | 3/2013 | Tendulkar | G06F 17/30289 717/134 |
| 2013/0085986 A1* | 4/2013 | Burger | G06F 9/505 707/609 |
| 2013/0086126 A1 | 4/2013 | Nanda et al. | |
| 2014/0317087 A1* | 10/2014 | Collins | G06F 17/30442 707/715 |
| 2017/0262518 A1* | 9/2017 | Messer | G06F 17/30584 |

OTHER PUBLICATIONS

Fritchey, Grant, "Query Performance Tuning in the Cloud", Oct. 24, 2013, <http://www.scarydba.com/wp-content/uploads/2009/09/QueryTuningAzureSQLDatabase.pdf.

IBM, "Tuning SQL with Optim Query Tuner, Part 1: Understanding access paths", as of Oct. 17, 2014, <http://www.ibm.com/developerworks/data/library/techarticle/dm-1006optimquerytuner1/index.html>.

IBM, "Tuning SQL with Optim Query Tuner, Part 2: Tuning individual queries", as of Oct. 17, 2014, <http://www.ibm.com/developerworks/data/library/techarticle/dm-1105optimquerytuner2/index.html>.

IBM, "Tuning SQL with Optim Query Tuner, Part 3: Workload capturing and tuning", as of Oct. 17, 2014, <http://www.ibm.com/developerworks/data/library/techarticle/dm-1207optimquerytuner3/index.html>.

Oracle, "Analyzing SQL with SQL Tuning Advisor", Oracle® Database SQL Tuning Guide, 12c Release 1 (12.1), as of Oct. 17, 2014, <http://docs.oracle.com/database/121/TGSQUI/tgsql_sqltune.htm#TGSQL540>.

Oracle, "Automatic SQL Tuning", Oracle® Database Performance Tuning Guide, 11g Release 2 (11.2), provided by searcher in search report dated Dec. 31, 2013, <http://docs.oracle.com/cd/E11882_01/server.112/e16638/sql_tune.htm#PFGRF028>.

Oracle, "Tuning SQL Statement", Oracle® Database 2 Day + Performance Tuning Guide, 12c Release 1 (12.1), provided in main idea of disclosure dated Oct. 9, 2013, <http://docs.oracle.com/cd/E24628_01/server.121/e17635/tdppt_sqltune.htm>.

"Reduce the Production Server Tuning Load", SQL Server 2014, <http://technet.microsoft.com/en-us/library/ms190389.aspx>.

U.S. Appl. No. 14/541,731 entitled "Query Tuning in the Cloud" filed Nov. 14, 2014.

* cited by examiner

QUERY TUNING IN THE CLOUD

BACKGROUND OF THE INVENTION

The present invention relates generally to the field of query optimization systems, and more particularly to cloud-implemented query optimization systems.

Broadly speaking, a database is any organized, or "structured," collection of data. Many types of databases are known, including navigational, relational, object-oriented, and document-oriented databases, to name a few. Databases are created, managed, and accessed by database management systems (DBMS), which typically include facilities for defining data models using some form of a data description/data definition language (DDL), specifying logical and physical storage organization for the database, and accessing, manipulating, and reporting on the data stored therein. A DBMS may store metadata about a database instance. This metadata, or catalog, can include information about database object structures, relationships, and states, as well as information and statistics about those objects, requests to access them, and the database system environment.

Data in a database is normally accessed and manipulated through the use of queries. The specific way in which a DBMS accesses data in response to a query is known as a query plan, execution plan, access plan, or simply a plan. There are often multiple possible plans for retrieving requested information from a given database, including multiple possible table joining and filtering sequences, multiple methods for joining tables, and multiple methods for accessing table data. The way in which a query is written or otherwise supplied may influence the actual plan to be used. For example, the selection and organization of the commands included in the query may direct or suggest the specific characteristics that a plan should have, as may any plan hints that might be associated with the query.

The specifics of queries and their associated plans can have a significant impact on query performance. In addition to the intrinsic organization of the query and plan themselves, various extrinsic factors can influence query performance as well, including the logical and physical organization of the database, characteristics of the data (for instance, table size), and characteristics of the hosting environment(s). For these reasons, there is significant interest in query tuning, which seeks to maximize query performance and/or minimize query costs by configuring the query plan, database, and/or hosting environment in an effective manner to accomplish these goals. Query tuning may be done during database design and development, but, because some database characteristics, including queries, may not be known beforehand or may change over time, query tuning may also be beneficial if done during the production lifetime of the database. Any controllable factors of the query, the database, or its environment may be changed during query tuning. Furthermore, query tuning may be done with respect to a specific query or, because changes that improve performance for one query may degrade it for another, query tuning may be done with respect to a collection of queries, known as a query workload. In the case of a query workload, tuning can include characteristics of the workload as a whole, such as relative query frequency or importance, in addition to characteristics of the individual queries themselves.

SUMMARY

According to an aspect of the present invention, there is a method, computer program product and/or system for tuning a production database system that performs the following steps (not necessarily in the following order): (i) receives a first query tuning request; (ii) obtains information about the production database system useful for setting up a first mimic of the production database system; (iii) sets up the first mimic of the production database system in a remote system environment; (iv) executes a first query tuning analysis on the first mimic database system; and (v) applies to the production database system a set of one or more recommendations generated from the first query tuning analysis executed on the first mimic database system. Execution of the first query tuning analysis does not substantially impact operation of the production database system. The steps are performed without substantial human intervention.

DETAILED DESCRIPTION

Figure 1:
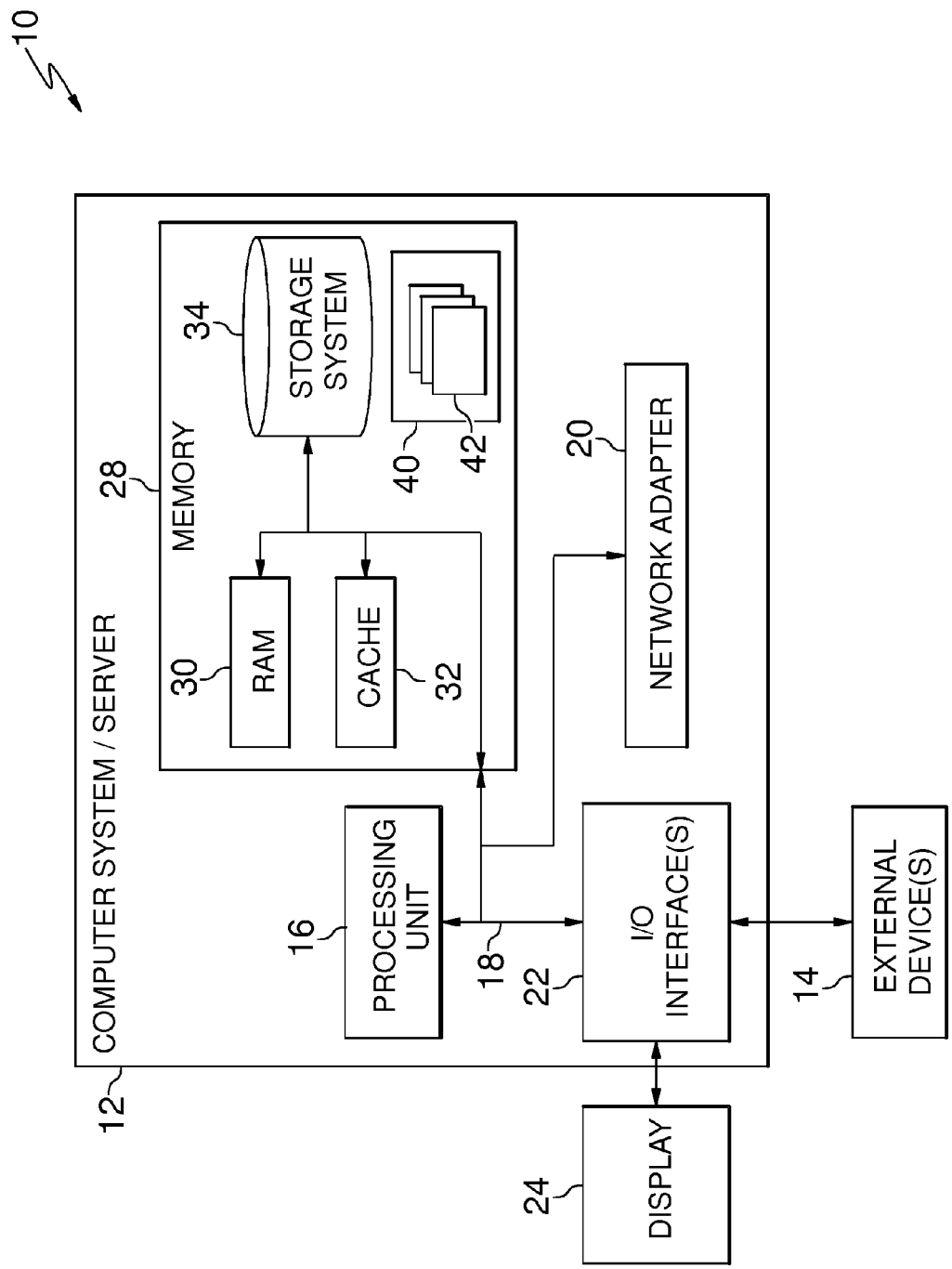
FIG. 1 depicts a cloud computing node used in a first embodiment of a system according to the present invention.

Some embodiments of the present invention offload query tuning efforts for a production database system by performing them on a mimic database set up on a remote system. The mimic system accurately represents the production system within the scope of the query tuning request, allowing the results of testing various alternatives configurations on the mimic system to be reliably applied to the production system. In some cases this framework is extensible, allowing multiple mimics to be simultaneously set up and used for processing the same or a different query tuning request. The entire process is performed with little or no human intervention. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
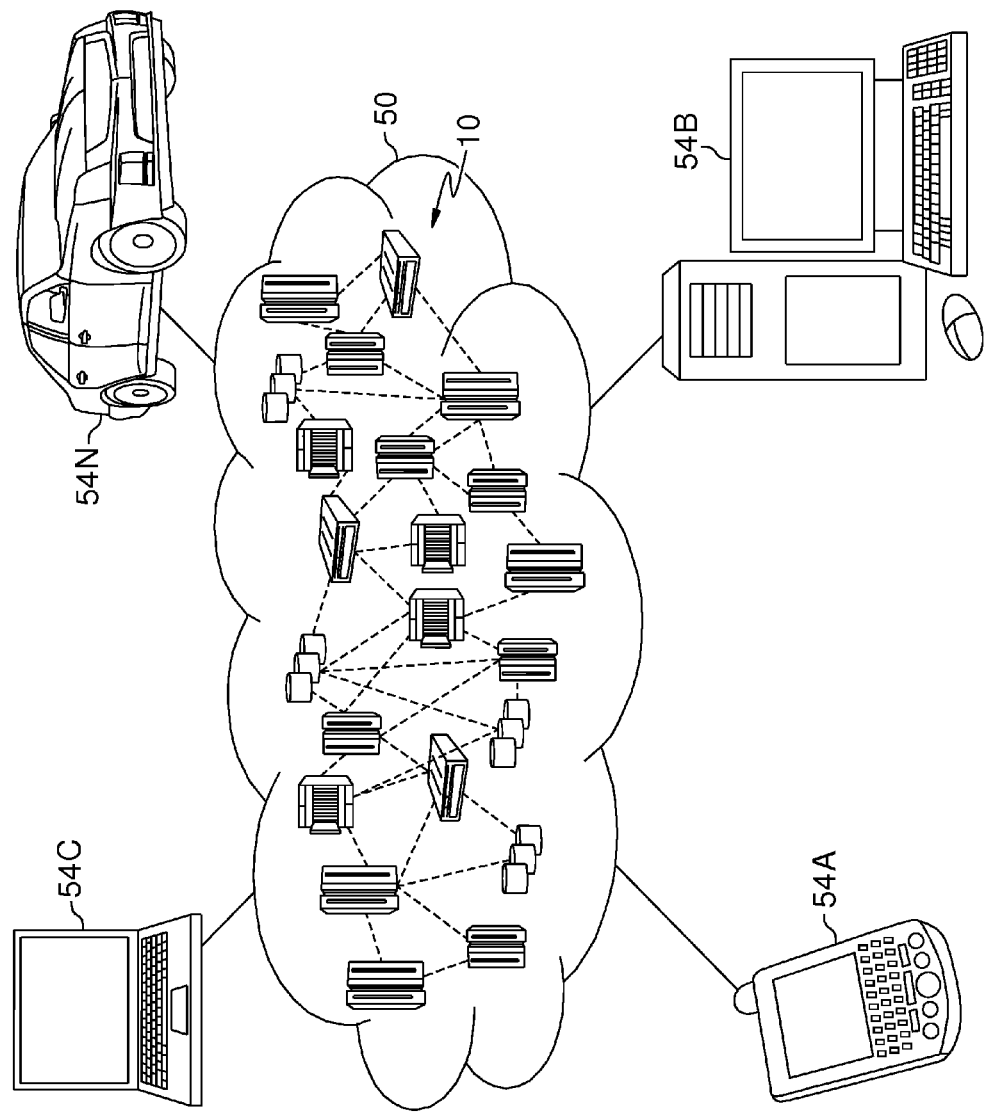
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
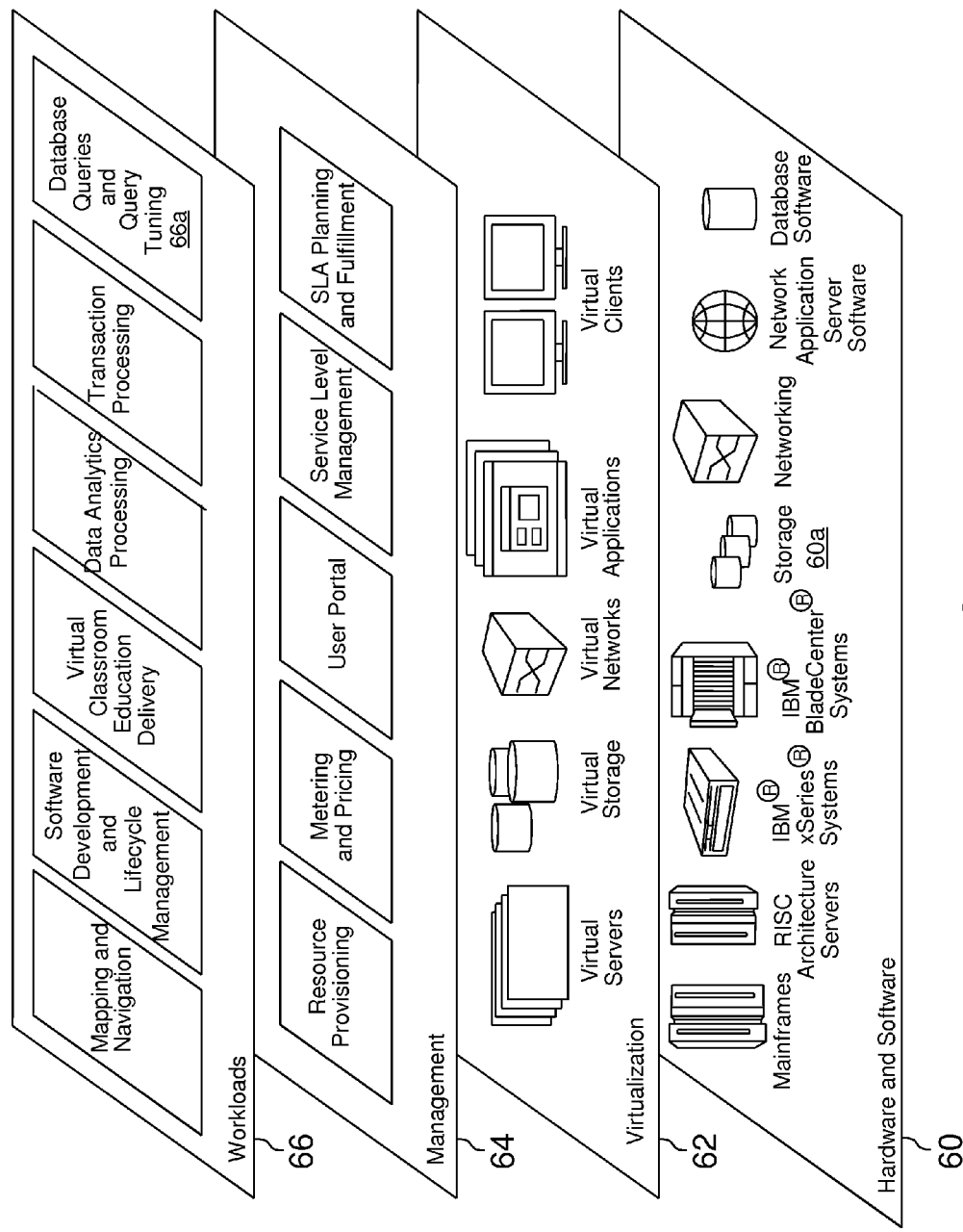
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 4:
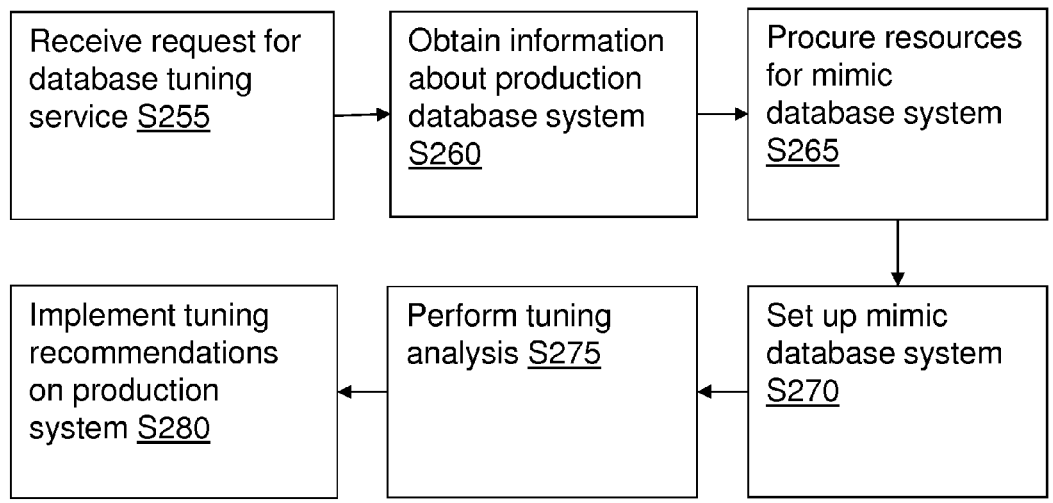
FIG. 4 is a flowchart showing a first embodiment method performed, at least in part, by the first embodiment system.
Figure 5:
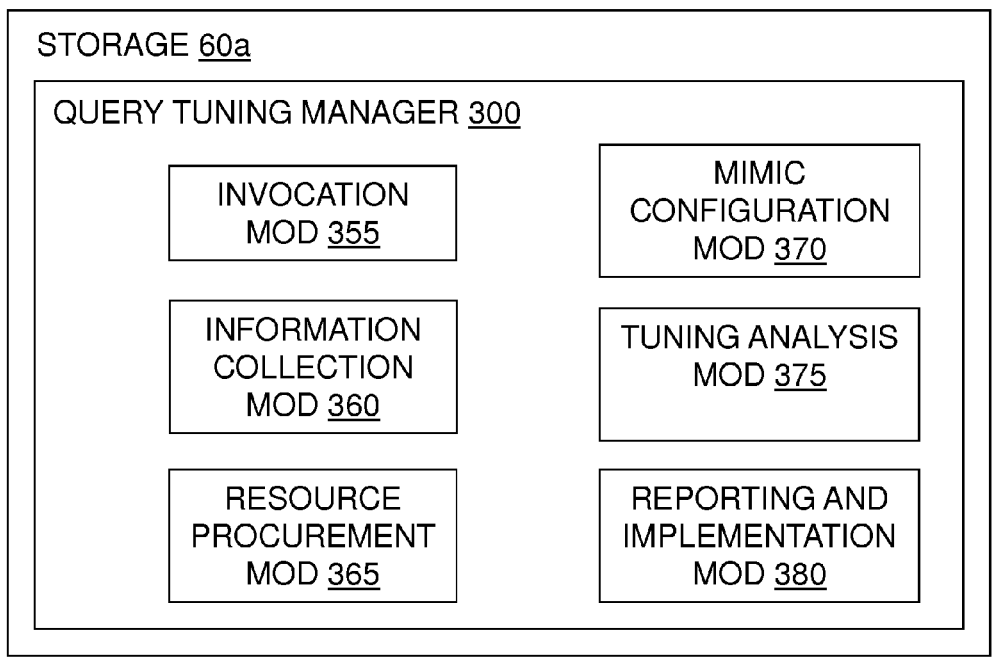
FIG. 5 is a block diagram view of a machine logic (for example, software) portion of the first embodiment system.

FIG. 4 shows flowchart 250 depicting a method according to the present invention. FIG. 5 shows query tuning manager (QTC) 300 for performing at least some of the method steps of flowchart 250. This method and associated software will now be discussed, over the course of the following paragraphs, with extensive reference to FIG. 4 (for the method step blocks) and FIG. 5 (for the software blocks). As shown in FIG. 5, one physical location where QTC 300 may be stored is in storage block 60*a* (see also FIG. 3). However, as will be apparent to those of ordinary skill in the art, the architectural components of QTC 300 and the database systems with which it operates may be flexibly located in various locations inside or outside of a cloud environment.

Processing begins at step S255, where invocation module ("mod") 355 receives a request for query tuning services for some database (the "production database"). The request is generated by a database administrator with respect to an important query whose performance has begun deteriorating in recent weeks. Alternatively, the request may cover multiple queries (that is, a query workload), be generated by other types of users, and/or may be triggered automatically by the database management system or QTC 300 itself based on various triggering criteria such as elapsed time, query performance changes, changes in database size or composition, upgrade of database management system software, changes to the hosting environment (for example, increased processing power), and so on. The request may be made at any stage in the lifecycle of the database, including design and development, as long as QTC 300 can obtain the information it needs to perform the tuning services currently being described. Though none are present in this example, the request may include constraints or suggestions on tuning goals, like "favor low latency over a small storage footprint" or "aim for a response time of 5 seconds or less" and/or on tuning solutions, such as "do not modify the existing join sequence" or "use DBMS product ABC, version 4.3."

Processing proceeds to step S260, where information collection mod 360 collects the information it needs to set up a mimic of the production database. A mimic is a replica that aims to imitate the original in every relevant way with respect to the scope of the query tuning request. For example, if the request only concerns two out of the one hundred tables that make up the production database, the mimic may only need to imitate the production database with respect to those two tables. Likewise, to the extent query tuning results are dependent on a specific database management software product or version, or on specific characteristics of the host system such as processing power or memory, information can be gathered in this step that will be useful in setting up the proper environment in the steps that follow. Stated another way, a mimic is a replica of a database that need only be defined using the metadata including the database schema, the database statistics, the system and database configuration settings, and so forth but does not require the data to be created in the mimic. That is, the mimic simulates the database system environment and database characteristics such that the same access plan can be achieved in the mimic as compared to the "real" database.

Examples of information that could be gathered include logical organization of the tables of interest, physical organization of these same tables, table characteristics such as table size and table columns, existence of indexes, query usage statistics, system characteristics such as DBMS configuration settings, operating system and hardware resources, and so on. Information may in some instances only include database metadata, while in others it may include some or all of the actual data contained in the tables of interest in the production database. The gathered information can come from a variety of sources, including automated requests to the production database system, prompted user input, and/or the query tuning request itself. In some embodiments, step S260 is split up so that an appropriate hosting environment and/or database management system can be set up before obtaining all the information necessary to create the mimic database itself.

Processing proceeds to step S265, where resource procurement mod 365 uses the environment information obtained in step S260 to set up an environment for the mimic database. This could simply mean identifying an existing cloud or non-cloud system that is suitable and available for use. Alternatively, resource procurement mod 365 may need to request that appropriate resources be allocated, configured, and/or repurposed, or it may need to carry out some or all of these steps on its own. In this case, for example, resource procurement mod 365 requests allocation of a virtual server with 4 GB of memory, 200 GB of storage, and a particular DBMS configured in a certain way from a resource provisioning unit of management layer 64 of cloud computing environment 50 (see FIGS. 2 and 3). Normally, the resources procured should be similar to the system resources of the original database in order to generate reliable results (unless the purpose of the tuning request is to determine what will happen to the query plans under a different set of system resources, such as a new database system release, in which case those specific resources should be varied accordingly).

Processing proceeds to step S270, where, once the mimic environment is set up, mimic configuration mod 370 uses production database information obtained in step S260 to set up the mimic database. The mimic database may be a full or partial replica of the production database, or may only simulate part or all of the production database via relevant database metadata (catalog data) through techniques such as those currently known in the art. In some cases, this could involve updating an existing mimic, such as to incorporate changes to the production database catalog since some prior mimic was created. Once created or updated appropriately, the mimic is used for the subsequent tuning analysis, thus off-loading this work from the production database system. In some cases, multiple mimics may be created to permit parts of the tuning analysis to be performed concurrently and/or to enable multiple tuning analyses from one or more tuning requests to be undertaken simultaneously. The resources allocated and used for any given tuning analysis may vary based on the requirements of the analysis, specific resources constraints associated with the tuning request, and/or overall constraints on resources such as an aggregate resource limit for concurrent tuning requests.

Processing proceeds to step S275, where tuning analysis mod 375 performs the requested tuning analysis on the mimic system set up in the previous steps. Because the mimic system is an accurate replica of the production system with respect to the scope of the tuning request (except for any parameters being varied as part of the tuning analysis itself), the mimic ensures that a given query will result in the same query plan being produced on the mimic system as in the production system, and that the mimic system will faithfully duplicate production system query behavior. This in turn allows reliable tuning recommendations for production to be produced from the mimic. In some embodiments, multiple tuning analyses deriving from one or more tuning requests may be conducted simultaneously with the same mimic.

Various aspects of the database system may be included in the tuning analysis. For example, the analysis could consider changes to the hosting environment such as more memory or processing power, changes to the DBMS such as a new software version or enablement of new features, changes to the logical design of the database or its physical layout, changes to the data or aggregate characteristics of the data it contains, and/or changes to the query plan. The tuning can include full what-if analysis, such as by systematic variation of table or query statistics (such as table size or query frequency), database design choices (for instance, index usage), or product versions. In the current instance, tuning analysis mod 375 determines that performance of the query being tuned could be improved by 20% by applying a different type of partitioning to table X, adding a new index for table Y, and modifying the query plan to join tables Y and Z before joining them with table X.

Processing proceeds to step S280, where reporting and implementation mod 380 acts on the results of the query tuning analysis by incorporating the tuning results into the production system in an automatic or highly automated fashion. In the current instance, for example, reporting and implementation mod 380 reports the results of the analysis to the database administrator who requested it, along with a prompt asking whether or not to proceed with implementation of the tuning recommendations. The administrator may choose all recommendations or only some of them, and may indicate that application of the selected recommendations should be performed immediately or scheduled for some future time. Implementation of tuning recommendations is thus accomplished without substantial human intervention. Alternatively, the user may be given an opportunity to customize the tuning recommendations that will be applied, or to select from among exclusive alternatives, in which case implementation of tuning recommendations is still accomplished without substantial human intervention. In yet other embodiments, the recommendations may be fully automated, without any additional required authorization or acknowledgement on the part of a user, although recommendations and implementation results may still be reported for audit purposes. In this way, QTC 300 automates the query tuning process, from request to provisioning to analysis to implementation.

Various embodiments may include one or more of the following features, characteristics and/or advantages: (i) interaction between the method steps requires no user prompting; (ii) the automation involves the ability for the tuning process to be triggered automatically by several criteria such as when performance of the current workload snapshot has decreased beyond some threshold; (iii) the query tuning itself is a service in the cloud invoked by the user to start this whole process; (iv) the process is applied on a company enterprise as opposed to a per-database system; (v) the process is applied on multiple enterprises, as the method is separated from the systems to be tuned; and/or (vi) the systems used for the mimic are virtual, thus allowing this system to be executed on an environment that need not incur the costs and resource allocation of using a "real" system to apply the method and create the mimic, adding to the flexibility on how and where such a method can be deployed and the impact of obtaining resources to execute the method.

III. Further Comments and/or Embodiments

Some embodiments of the present invention recognize the following facts, potential problems and/or potential areas for improvement with respect to the current state of the art: (i) in today's technology, query tuning is implemented as a client tool operating on a production database server; (ii) this query tuning usually requires what-if analysis to use virtual database changes to determine query plan and cost changes, which in turn allow either the tuner via its features or the customer to determine the benefits of the changes; (iii) these virtual changes are executed on the database server, impacting the server's resources and regular workload (that is, query tuning uses the production database server to perform what-if analysis scenarios); and/or (iv) even if a catalog simulation is used to perform what-if analysis on the production system to allow virtual changes without affecting the real catalog, resources on the production system are still impacted.

Some embodiments of the present invention recognize, however: (i) that customers require tuning with little or no impact on production systems; and/or (ii) that to alleviate the impact of tuning on a database server, the database information could be offloaded onto another machine, where the other system could be, for example, on a user enterprise system such as a test system, on a private or public cloud-based resource, and/or on a database system provided on a virtual machine.

To allow this offloading, some embodiments of the present invention: (i) pass the production catalog information to the remote system such that a mimic, or simulation, of the database can be created on the remote system (depending on what objects are being tuned in the workload, only the portion of the catalog that contains these objects may need to be mimicked on the remote server); (ii) set up the mimic on the remote system, including the data description language (DDL) and statistics information of the relevant objects to be tuned; (iii) run tuning on the remote system once the mimic is set up; (iv) allow users to perform remote analysis and what-if testing scenarios to change items (such as the database design) to determine the effects on database and workload performance; (v) pass recommendations for changes arising from the tuning process to the user; and/or (vi) apply such recommendations manually or automatically on the production system.

In some embodiments of the present invention, the remote mimic is used to migrate the production catalog to a newer release on the remote system to determine: (i) how new features will work; (ii) if plan changes might occur; and/or (iii) what tuning would be required. The resulting tuning recommendations can then become part of the migration process. Accordingly, some such embodiments may: (i) recognize that customers may want data on an upsell before pursuing it; (ii) recognize that customers may want to try out a newer release or system before purchasing it; (iii) help users on a previous release determine whether to move to a newer release; (iv) allow users on a previous release to try out new release features; and/or (v) perform tuning on a new release that allows for comparison of workload performance and/or plan structures that may indicate further tuning under the new release is required.

Some embodiments of the present invention recognize: (i) that conventional query tuning uses the production database server to perform what-if analysis scenarios; (ii) that catalog simulation can be used to perform what-if analysis on the production system to allow virtual changes without affecting the real catalog, but resources on the production system are still impacted; (iii) that remote tuning can be done by executing the process manually; (iv) that conventionally, tuners execute directly on the production system or require manually setting up a test database server for tuning; and/or (v) that nothing currently exists to automatically offload production information and perform tuning on a remote system to avoid production system impact.

Some embodiments of the present invention therefore: (i) automate this whole process by combining a remote mimic, remote tuning, and production tuning recommendations, putting them together in an automated process; (ii) provide query tuning as a web service which combines the remote mimic setup, remote tuning, and production tuning recommendations put together in an automated process; and/or (iii) provides tuning as a web service where the tuning is on a remote server.

In some embodiments of the present invention, a tuning web server applies the following automated/modified steps: (i) copy a subset of catalog information from production to a remote system (for example, extract the required data definition language (DDL) statements to reproduce the database objects of a production database on a test database, and/or ship over database and system diagnostic information from the production environment to the remote system); (ii) create a mimic of the production database on the remote system; (iii) invoke query tuning features to run using the remote system, which may include what-if analysis features to virtually add objects and plan with cost changes; (iv) provide results including plan comparison from the tuning web server application; and/or (v) ship recommendations back to the production system to be applied (such as through email notification for a user to apply manually or via automatic implementation).

Figure 6:
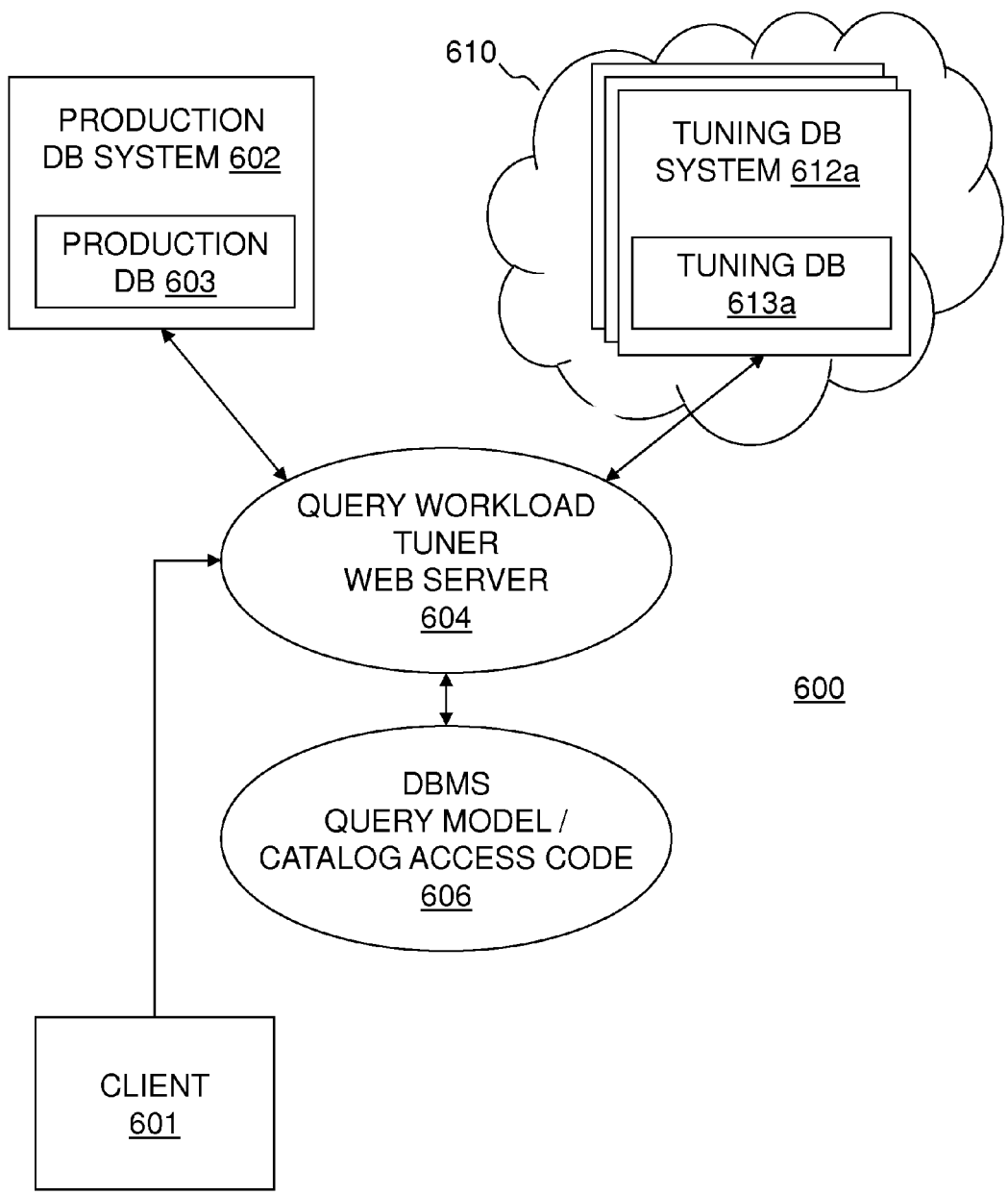
FIG. 6 is a diagram view of a second embodiment system according to the present invention.

Shown in FIG. 6 is diagram 600, depicting an embodiment system of the present invention. Diagram 600 includes: client 601; production database system 602; production database 603; query workload tuner (QWT) web server 604; database management system query model/catalog access code 606; cloud 610; tuning database system 612a; and tuning database 613a. Tuning database system 612a and tuning database 613a are each one of many in this embodiment, all hosted in cloud environment 610. Other cloud and non-cloud arrangements of the components of diagram 600 will be apparent to those of skill in the art. These components will be explained in further detail below in conjunction with the discussion of the flowchart of FIG. 7.

Figure 7:
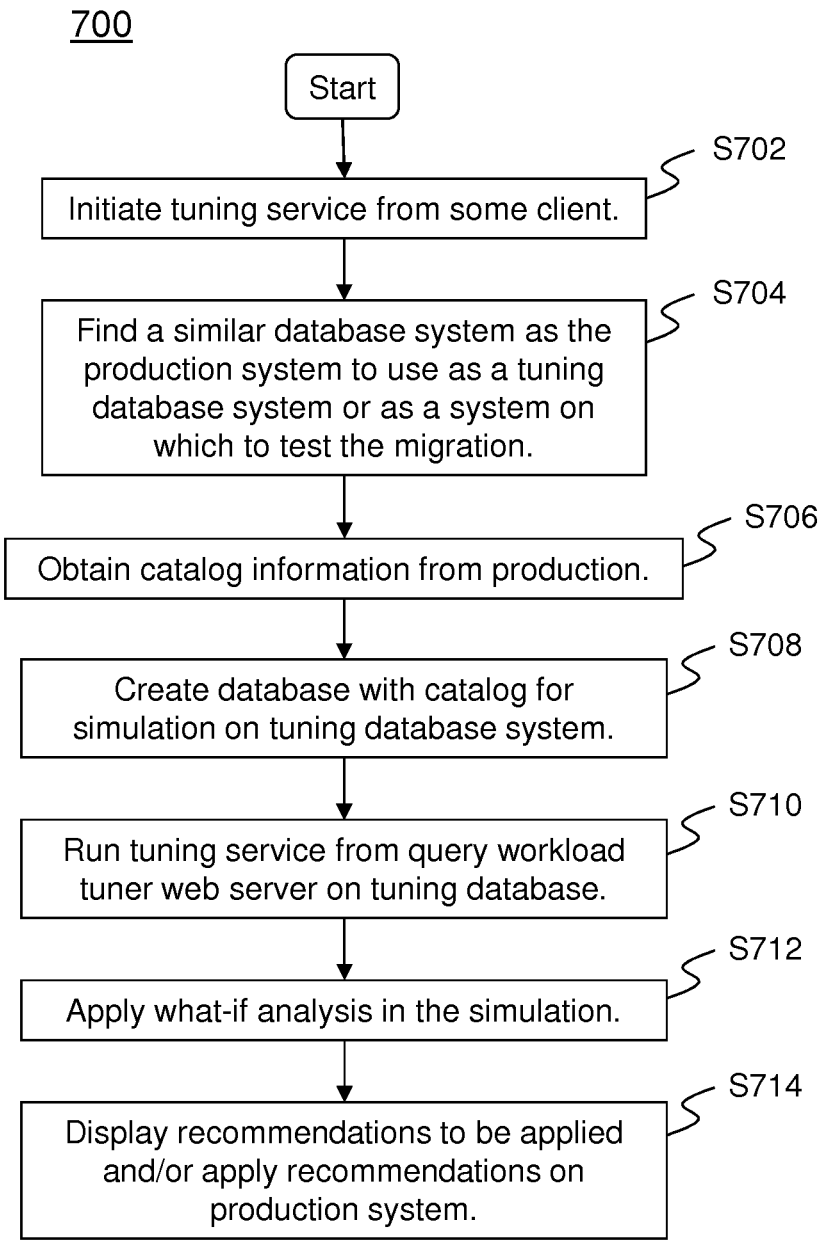
FIG. 7 is a flowchart showing a second embodiment method preformed, at least in part, by the second embodiment system.

Shown in FIG. 7 is flowchart 700, describing an embodiment method of the present invention. This method begins at step S702, where client 610 requests QWT web server 604 to initiate some database tuning service for production database system 602. In step S704, QWT web server 604 then identifies, requests, or creates tuning database system 612a, a similar database system to production system 602, which will become the tuning database system (or a system on which to test a migration from one database system product or version to another). Processing proceeds to step S706, where QWT web server 604 obtains the necessary catalog information from production database system 602 to be able to create (or update) a simulation of production database 603 on tuning database system 612a. QWT web server 604 then creates (or requests to be created) tuning database 613a in step S708 to simulate production database 603 on tuning database system 612a using the catalog information obtained in the previous step. This simulation may include: (i) mimicking the production configuration in the tuning database; (ii) applying delta changes from the production database to the tuning database if it already exists or automatically recreating the production database on the tuning database system if it doesn't; and/or (iii) simulating multiple productions (that is, creating multiple tuning simulations via multiple tuning databases/database systems for concurrent analysis of different scenarios).

Once tuning database 613a is set up, QWT web server 604 obtains query model/catalog access information 606 associated with the query or query workload to be tuned and begins running the tuning service on tuning database system 612a in step S710. This includes step S712, applying one or more what-if analyses to the simulation.

What-if analysis is the ability to be able to "change" the current database state or setting to allow a user to determine the impact of such a change on a workload. An example is what-if index analysis, in which virtual indexes are created that add to the list of indexes in the database catalog definition to determine whether the new indexes provide better performance than existing indexes. Another example is what-if analysis on changing the size of the database from what it is currently to potentially be 10 times bigger, which could be done by manipulating the database statistics in the mimic to enlarge the database object sizes. A user can compare plans and costs for the workload before and after changes are made to the mimic to determine the impact (improvement or degradation) from the original workload performance.

In the case of seeing the affects of a database enlarging to 10 times the size, the number of rows could be increased on each table by a factor of 10 along with changing column cardinality statistics by a factor of 10 or pro-rated on the number of values compared to the number of rows in the original database. For example, if a table in the database is 1,000 rows, then in the enlarged mimicked database, it would be changed to have 10,000 rows in the catalog statistics for the table. When a query plan is constructed on the optimizer using the mimic it will use the changed statistics, thus resulting in a plan that accounts for the table being 10,000 rows instead of 1,000 rows in the query plan from the original database state. The optimizer may choose to change table access methods, join methods and order because of the database enlargement statistics, and the plan estimated costs will also change. A user may use this approach to determine if the plan structure will change between the original and mimicked databases. If it does not change or the table or index access does not change, this may indicate that the database state is flexible enough to provide performance benefits on the database in the future as the database grows.

Finally in step S714, after running the tuning service and applying what-if analysis, tuning recommendations resulting from these efforts are supplied to client 610 and/or may be applied automatically to production database system 602.

Some embodiments of the present invention may include one, or more, of the following features, characteristics and/or advantages: (i) automate all the steps described in FIG. 7; (ii) include tuning that allows changes to virtual statistics so as to determine plan and performance changes to a workload; (iii) include a remote simulation that allows multiple users and/or tuning in parallel for the same or different production databases; (iv) include simulations that can be updated from the production system(s) and that adhere to an overall limit on the resources; (v) automate virtual database migrations and add tuning recommendations to the migration process; and/or (vi) allow various pricing models for tuning as a web service, such as (a) charging to reserve a similar remote system as the user's production system (for example, in the cloud), (b) charging per tuning service run, and/or (c) charging based on savings that the service yields.

Some embodiments of the present invention may include one, or more, of the following features, characteristics and/or advantages: (i) automate moving production system information to a remote system; (ii) automate setting up the remote system; (iii) take tuning recommendations that are generated by using full what-if analysis on a test system and apply them to the production system; (iv) automatically off-load work for a tuning effort onto a remote mimicked system; (v) automatically apply tuning results from the remote mimicked system to the production system; and/or (vi) guarantee that the remote database system that is set up as a mimic exactly matches what will happen on the production system, with query plans being duplicated and tunable such that changes applied from the remote system to the production system will have the same effect in both systems.

Some embodiments of the present invention may include one, or more, of the following features, characteristics and/or advantages: (i) provide a simple and inexpensive solution for a tuning and recommendation process by allowing an on-demand creation of a remote database mimic of a production database that need only stay alive for the duration of the tuning and recommendation process; (ii) keep the simulation of the production system up to date on the remote system by collecting delta changes to the production system catalog over time; and/or (iii) provide automated, on-demand simulation and tuning that require less of a footprint on the remote systems and less administration than conventional approaches, thus allowing for remote tuning of multiple production systems at the same time, and/or allowing multiple concurrent simulations of the same production system, without incurring additional resource costs, or permitting less resource-intensive simulation of a single production system.

Some embodiments of the present invention may include one, or more, of the following features, characteristics and/or advantages: (i) use the query tuning tool idea as a basis; (ii) include the idea of automatically making a remote test system mimic; (iii) include a query tuning tool that oversees the effort of applying what-if analysis applications for tuning on a remote system and recommending and applying those recommendations in production; (iv) emulate a production system on a test system in the cloud; (v) include catalog information such as statistics and/or capture statements from production to help tune the workload on the test system and provide recommendations to production; (vi) work on newer releases of a database system on the test machine to determine what the workload would do if the production were migrated; (vii) have the ability to keep a simulation alive by applying delta changes to the catalog so that the test system need not be thrown away any time; (viii) keep multiple simulations alive for one or more production systems at the same time based on overall resources allowed on the remote test machine; (ix) create new simulations by throwing away older unused ones if resources become an issue; (x) output a plan hint such that the query plan is obtained in production as in the test system; and/or (xi) do what-if analysis on changing database design (for example, by integrating the concept of using sampling statistics to use in what-if statistics analysis, where the sample statistics are applied to make it seem new statistics are collected, and if they are found to be useful then recommending these be applied to the production system).

Some embodiments of the present invention may include one, or more, of the following features, characteristics and/or advantages: (i) work on multiple queries at a time; (ii) include tuning that involves changing statistics collected and/or database design changes; (iii) include a greater number of tuning actions than just rewriting queries; (iv) include what-if analyses for possible tuning actions; (v) make an emulated database from production; (vi) automatically obtain a remote resource, set up the test system simulation, and then perform tuning features on that; (vii) automatically make a simulated test database system and perform what-if statistics analysis on that test system; (viii) set up a test system, allow statements to be shipped for tuning on that test system, and keep the test system up to date; (ix) handle multiple simulations for multiple production systems; (x) include an overall architecture that can automate setting up a test system on the fly, tuning of that system after the set up, and shipping back the resulting recommendations; (xi) handle multiple tests; (xii) set up a simulation as a workhorse to allow an automated architecture; and/or (xiii) take production system information and set up a separate mimic of that system to run tuning features elsewhere such as in the cloud.

In some embodiments of the present invention, (i) delta changes to the catalog are shipped to the remote system to update the remote database instead of always creating one from scratch; (ii) on-going remote tuning is enabled, as well as multi-user tuning where each tuning potentially shares the same resources; and/or (iii) the database is simulated on a newer release database system on the remote server, and new release features can be tested and plans can be generated and compared to the previous release. Simulating the newer release allows what-if analysis to be used to determine what plans would be on a new release and to determine how plans change with the new release's features. For example, version 5 could be used in production and version 6 could be tried out to compare plans and run tuning analysis. One way this could be done is with two remote systems, one running version 5 and the other version 6, with tuning being compared between the two remote systems and/or with the current configuration of the production system. Plan hints generated from production can be used to make sure the same plan is obtained on the test system, then the new release's plans can be compared to those.

In some embodiments of the present invention, when a statement is tuned on the test system, the plan hint defining that plan is shipped back to the production system. This allows the same plan to be produced on production, and allows the tuned plan to be run to compare execution times to the original plan. In some embodiments, selecting what to execute remotely, and/or the interaction between production and remote systems, is done using webification and/or email notifications. Some embodiments allow multiple simulations at the same time for the same and/or different production databases. This allows for a cache of database simulations on the remote server. A limit may be placed on remote system resources such that older and/or less frequently used database simulations are removed.

In some embodiments of the present invention, the following are combined into an automatic process: (i) tune as a remote service, with the tuner running as a web application on a web server; (ii) automatically obtain database information and re-create a mimic of the database on a remote system, where the remote system is on a user supplied system, a virtual machine, and/or a system obtained in the cloud; and (iii) run tuning features from the web server to tune the remote database system, obtain recommendations from this system, and view and/or apply the recommended tuning to the local production system.

In some embodiments of the present invention, tuning is done on a mimic of the database with what-if statistics analysis using virtual statistics. The idea here is to estimate statistics to update as virtuals in the mimic and compare plans and cost changes before and after the statistics changes are made. In some embodiments, sampled data may be used to set up a sample (tuning) database and determine initial statistics information, which is then used for tuning and is modified for what-if analysis.

In some embodiments of the present invention, a remote simulation can allow multiple users and/or tuning in parallel for the same and/or different production databases, with simulations that are updated from the production system(s) and which adhere to a limit on resources. Limited resources imply a limit on the number of allowed tuning sessions, and require the tuning web server to decide which sessions to remove or share/re-use. To avoid removing a heavily used simulation but limit its duplication, it may be imported just once, with what-if changes being undone so it can be re-used for future sessions. In some embodiments, the system is allowed to keep the simulation up to date for continual tuning by obtaining a delta change from the production database and automatically updating the simulated database over time.

Some embodiments of the present invention perform automatic virtual database system migration testing. Remote tuning is done on a new release of a database system to test changes and tune the system to determine what will happen if the current database system were migrated to a newer release. This allows testing of new release features on the database as well as the determination of execution plan changes and cost changes.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Query tuning request: a request to analyze the performance of a query or set of queries (query workload) with respect to varying one or more aspects of a database system, typically performed with a view toward maintaining or improving performance; aspects considered may include one or more of those from the following non-limiting list: database logical and/or physical structure, query plan composition and/or command sequence, selection and/or configuration of the database management system product or version, and characteristics of the host environment.

Production database system: a database system for which tuning is requested, as distinguished from a mimic database system on which the tuning is performed; may be a production database system in the conventional sense of being deployed for use in on-going business operations, but could also be, for example, a test system, a backup system, or a system under development.

Remote system environment: a real or virtual environment independent of a primary system environment such that resources consumed in the remote system environment do not substantially impact operations in the primary system environment; the environments may share the same virtual or even physical resources (such as in the case of cloud computing), but do so in a way that maintains performance of the primary system (for example, by allocating additional resources upon receiving a request to establish a remote system environment).

Concurrent execution: execution of a computer instruction or set of instructions which at least partially overlaps in time with execution of another computer instruction or set of instructions.

What is claimed is:

1. A method for tuning a production database system, the method comprising:
   receiving a first query tuning request identifying a first untuned query to be tuned, with the first query being directed toward a first production database operated on a first set of computer hardware, with the first production database including substantive data and catalog data, and with the catalog of the first database including first database schema, first database statistics, system configuration settings, database configuration settings, capture statements from production, data description language (DDL), database object structures, database object relationships, database object states, and historical requests to access database objects;
   setting up a first mimic of the first production database on a second set of computer hardware, with the first mimic including at least a portion of the catalog data of the first production database but not the substantive data of the first production database; and
   performing query tuning of the first untuned query using the first mimic operating on the second set of computer hardware to obtain a first tuned query; and outputting the first tuned query;
wherein the setting up the first mimic includes:
   determining a plurality of relevant objects with respect to the first untuned query,
   selecting a relevant portion of the catalog data of the first production database that relates to the relevant objects of the first untuned query, and
   setting up the first mimic to include the relevant portion of the catalog data.

2. The method of claim 1 further comprising: running the first tuned query on the first production databased to obtain first tuned query results based on the substantive data of the first production database.

3. The method of claim 1 wherein the second set of computer hardware includes a web server.

4. The method of claim 1 wherein the performance of query tuning changes catalog data of the first mimic, but does not change catalog data of the first production database.

5. The method of claim 1 wherein the performance of query tuning includes:
creating a plurality of virtual indexes to add to a list of indexes in catalog data of the first mimic;
determining that use of the plurality of virtual indexes would provide better performance than indexes existing in the first production database; and
responsive to the determination that the plurality of virtual indexes would provide better performance, including the plurality of virtual indexes in the first tuned query.

6. A method for tuning a production database system, the method comprising:
   receiving a first query tuning request identifying a first untuned query to be tuned, with the first query being directed toward a first production database operated on a first set of computer hardware, with the first production database including substantive data and metadata, and with the metadata of the first database including logical organization of a plurality of tables of the first production database, physical organization of the plurality of tables, table size of each of the plurality of tables, identities of table columns of each table of the plurality of tables, a plurality of currently compiled indexes for the plurality of tables, query usage statistics and DBMS (database management system) configuration settings, operating system used to operate the first production database and hardware resources included in the first set of computer hardware;
   setting up a first mimic of the first production database on a second set of computer hardware, with the first mimic including at least a portion of the metadata of the first production database but not the substantive data of the first production database; and
   performing query tuning of the first untuned query using the first mimic operating on the second set of computer hardware to obtain tuning information;
   wherein the setting up the first mimic includes:
   determining a plurality of relevant objects with respect to the first untuned query,
   selecting a relevant portion of metadata of the first production database from catalog data of the first production database that relates to the relevant objects of the first untuned query, and
   setting up the first mimic to include the relevant portion of the catalog data.

7. The method of claim 6 further comprising: tuning the first query based, at least in part, on the tuning information to obtain a first tuned query.

8. The method of claim 7 further comprising: running the first tuned query on the first production databased to obtain first tuned query results based on the substantive data of the first production database.

9. The method of claim 6 wherein the performance of query tuning changes metadata of the first mimic, but does not change metadata of the first production database.

10. The method of claim 6 wherein the tuning information includes information indicative of a first additional index to be added to the first production database.

* * * * *